United States Patent
Frazier et al.

(10) Patent No.: US 7,108,305 B2
(45) Date of Patent: Sep. 19, 2006

(54) AUTOMOTIVE SEAT ASSEMBLY HAVING A REAR LATCH LOCKOUT AND SPRING ASSIST

(75) Inventors: Brent Frazier, Bellvue, NE (US); Scott Lavoie, Red Oak, IA (US)

(73) Assignee: Intier Automotive Inc., Newmarket (CA)

( * ) Notice: Subject to any disclaimer, the term of this patent is extended or adjusted under 35 U.S.C. 154(b) by 401 days.

(21) Appl. No.: 10/771,802

(22) Filed: Feb. 4, 2004

(65) Prior Publication Data

US 2004/0174037 A1    Sep. 9, 2004

(51) Int. Cl.
*B60N 2/02* (2006.01)

(52) U.S. Cl. .................................. 296/65.03; 297/336

(58) Field of Classification Search ............. 296/65.03, 296/65.09, 65.08; 297/332, 336
See application file for complete search history.

(56) References Cited

U.S. PATENT DOCUMENTS

| | | | | |
|---|---|---|---|---|
| 4,865,377 A * | 9/1989 | Musser et al. ........... 296/65.03 |
| 4,884,843 A | 12/1989 | DeRees |
| 5,238,285 A | 8/1993 | Holdampf et al. |
| 5,498,051 A * | 3/1996 | Sponsler et al. ......... 296/65.03 |
| 5,562,322 A | 10/1996 | Christoffel |
| 5,626,391 A * | 5/1997 | Miller et al. ............. 296/65.03 |
| 5,671,965 A * | 9/1997 | O'Connor ................. 296/65.06 |
| 5,722,727 A * | 3/1998 | Unckrich ...................... 297/336 |
| 5,775,763 A * | 7/1998 | Glinter et al. ........... 296/65.03 |
| 6,000,742 A | 12/1999 | Schaefer et al. |
| 6,024,411 A * | 2/2000 | Pesta et al. .............. 296/65.01 |
| 6,053,555 A * | 4/2000 | Neale ....................... 296/65.03 |
| 6,145,913 A | 11/2000 | Odagaki |
| 6,161,890 A * | 12/2000 | Pesta et al. .............. 296/65.03 |
| 6,196,610 B1 * | 3/2001 | Pesta et al. .............. 296/65.03 |
| 6,213,525 B1 * | 4/2001 | Nicola ...................... 296/65.03 |
| 6,279,981 B1 * | 8/2001 | Mesnage ................. 296/65.03 |
| 6,286,886 B1 | 9/2001 | Odagaki |
| 6,361,098 B1 * | 3/2002 | Pesta et al. .............. 296/65.03 |
| 6,523,899 B1 * | 2/2003 | Tame ......................... 297/335 |
| 6,629,710 B1 * | 10/2003 | Shafry et al. ............... 292/216 |
| 6,945,585 B1 * | 9/2005 | Liu et al. ................. 296/65.03 |

\* cited by examiner

*Primary Examiner*—Kiran B. Patel
(74) *Attorney, Agent, or Firm*—Clark Hill PLC

(57) ABSTRACT

A seat assembly selectively engages forward and rearward strikers along a floor of a motor vehicle. The seat assembly includes a seat cushion and a seat back pivotally coupled to the seat cushion. The seat assembly also includes a seat riser mounted to the seat cushion and including spaced apart rear legs. The seat riser includes rear latches operatively coupled to each of the rear legs for movement between a latched position engaged with the rear latches and an unlatched position disengaged from the rear latches. A spring assist member includes a lever portion extending between a first end fixedly secured to said rear leg and an opposite second distal end for engaging the rearward striker to assist in pivoting said seat assembly about the forward strikers as said rear latches release the rearward strikers in the unlatched position.

10 Claims, 6 Drawing Sheets

AUTOMOTIVE SEAT ASSEMBLY HAVING A REAR LATCH LOCKOUT AND SPRING ASSIST

FIELD OF THE INVENTION

The invention relates to a seat assembly for a motor vehicle. More particularly, the invention relates to a spring assist member for lifting a seat assembly and a rear latch thereof away from a rear striker.

DESCRIPTION OF RELATED ART

A seat assembly for a motor vehicle typically includes a seat cushion adapted to be mounted to a floor, and a seat back pivotally coupled to the seat cushion for movement between an upright, seating position and a forwardly folded position. The seat cushion is frequently supported by a riser assembly, which is detachably coupled to the floor. More specifically, the riser assembly includes front latches coupled to front strikers recessed in the floor, and rear latches coupled to rear strikers recessed in the floor.

The front and rear latches engage the respective front and rear strikers to maintain the seat assembly in the aforementioned seating and folding positions. With the seat assembly in the folded position, the rear latch may, however, be disengaged from the rear striker to allow the seat assembly to pivot forwardly about the front striker until it reaches a tumbled position. In the tumbled position, the seat cushion and the seat back are generally perpendicular to the floor such that the space vacated by the seat cushion and the seat back are now available for storage. In order to maximize storage space, the front latch may be disengaged from the front striker to allow for complete removal of the seat assembly from the motor vehicle.

Seat assemblies tend to be relatively heavy. Thus, maneuvering the seat assembly between the various above-mentioned positions can be a cumbersome task. In particular, the lifting involved in moving the seat assembly from the folded position to the tumbled position is difficult for many individuals.

Various mechanisms for assisting movement of the seat assembly into the tumbled position are known to those skilled in the art. For example, U.S. Pat. No. 5,238,285 discloses a folding vehicle seat assembly including an upper frame for supporting a seat back, and a lower frame for supporting a seat cushion. A pair of support mechanisms provides for pivoting movement of the lower frame. Each support mechanism includes first and second retention mechanisms for releaseably retaining the seat assembly in a use position and a tumbled position. Each support mechanism also includes a rear support member pivotally coupled to the lower frame. In addition, each support mechanism includes an upper front support member pivotally interconnected to form a knee joint with a lower front support member by a pivot pin. A high-spring-rate assist spring interconnects the rear support member and the pivot pin. The assist spring is loaded in tension when the seat assembly is in the use position to assist in the movement of the lower frame from a use position to a tumbled position.

U.S. Pat. No. 6,523,899 is directed to an automated fold and tumble motor vehicle seat assembly. The seat assembly includes a seat cushion and a seat back pivotally secured thereto. A seat riser supports the seat cushion. The seat riser includes front and rear legs having front and rear latches releasably engaging respective forward and rearward strikers along a motor vehicle floor. A stop member is pivotally mounted to each rear leg and engages each rear latch when in a disengaged position. A biasing member is connected to each stop member to continuously bias the stop member into engagement with the rear latch. Clock-type springs are mounted on rivets along the front legs to bias the seat assembly from an operative position to a tumbled or storage position when the rear latches disengage the rear strikers. The clock-type springs assist in pivoting the seat assembly toward its tumbled position such that a rear portion of the seat assembly moves away from the rearward strikers when the rear legs are unlatched.

SUMMARY OF THE INVENTION

A seat assembly selectively engages forward and rearward latches along a floor of a motor vehicle. The seat assembly includes a seat cushion and a seat back pivotally secured thereto. A seat riser is coupled to the seat cushion and includes spaced apart rear legs. The seat riser also includes rear latches operatively coupled to the rear legs for movement between a latched position engaging the corresponding rearward strikers and an unlatched position disengaged from the corresponding rearward strikers. A spring assist member includes a lever portion extending between a first end fixedly secured to the rear leg and an opposite second distal end for engaging the rearward striker to assist in pivoting the seat assembly about the forward strikers and into a tumbled position when the rear latches release the rearward strikers.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
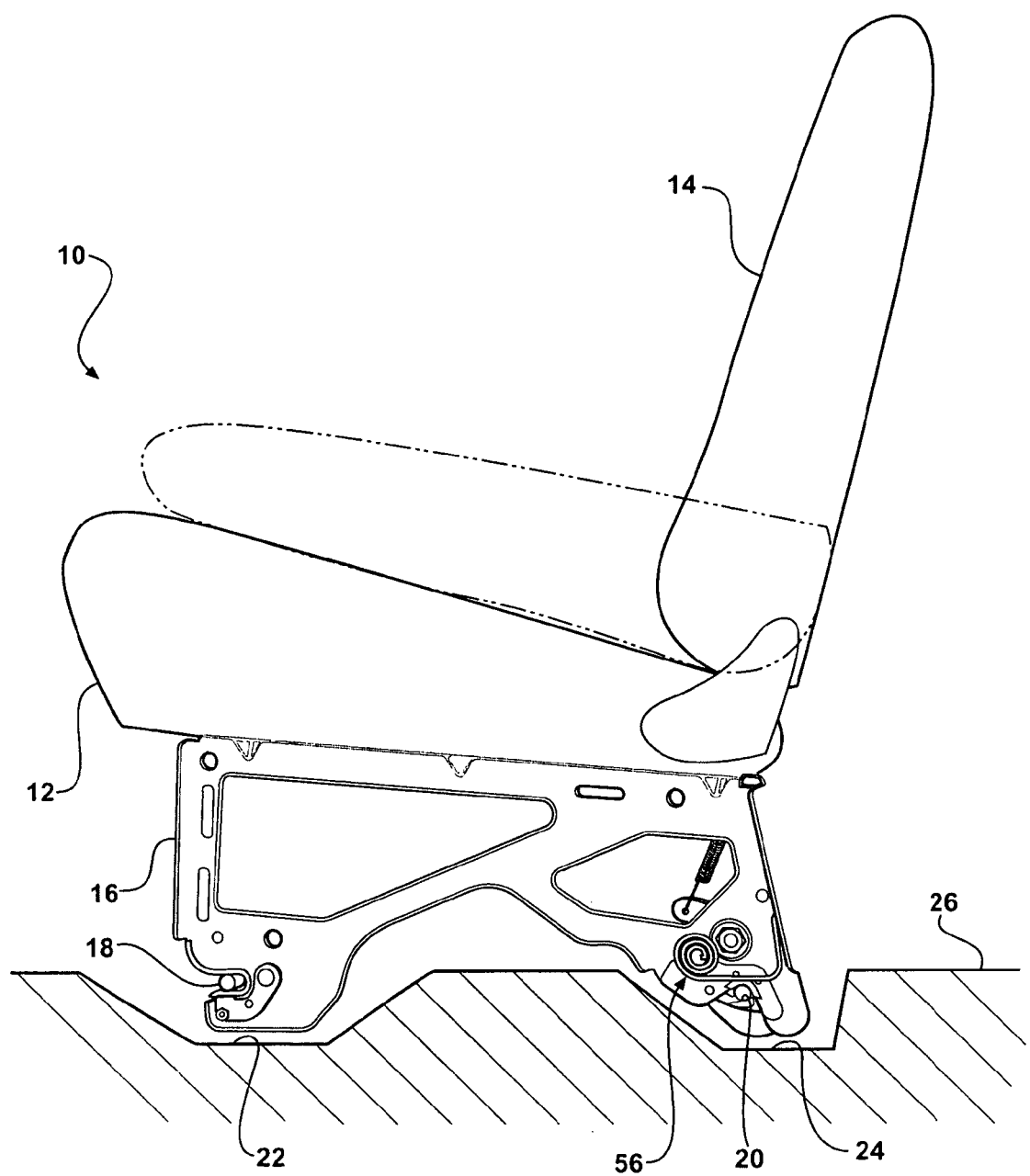
FIG. 1 is a side view of a seat assembly according to the invention engaging forward and rearward strikers along a motor vehicle floor.

Referring to FIG. 1, an automotive seat assembly, generally shown at 10, includes a seat cushion 12 and a seat back 14 pivotally coupled thereto. A seat riser 16 is coupled to the seat cushion 12. The seat riser 16 is also detachably coupled to forward 18 and rearward 20 strikers disposed within recesses 22, 24 along a floor 26 of an automotive vehicle.

Figure 2:
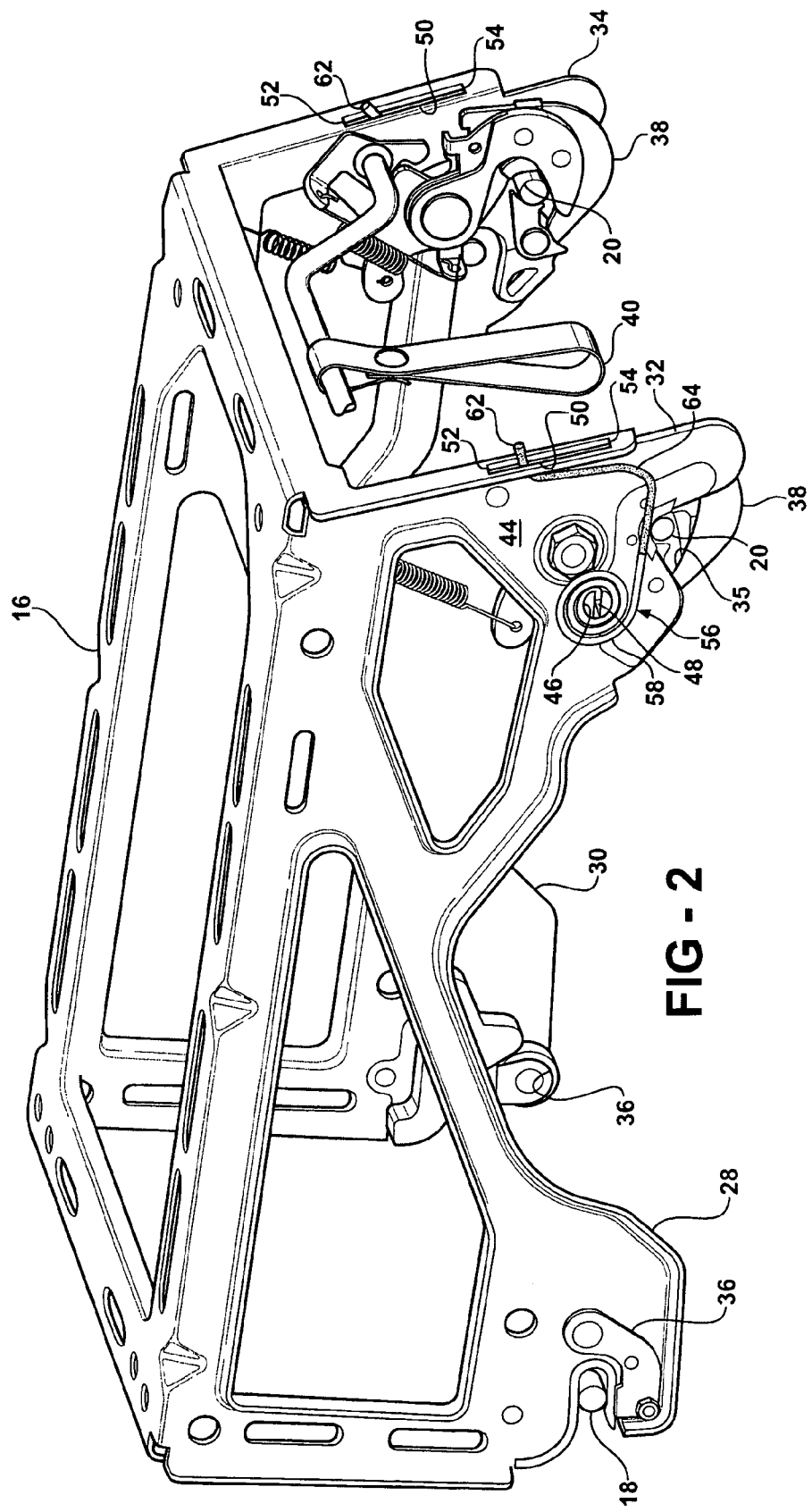
FIG. 2 is a perspective view of a seat riser including a spring assist member and a rear latch in a latched position.

Referring to FIG. 2, the seat riser 16 includes spaced apart front legs 28, 30 and opposing rear legs 32, 34. Each of the front legs 28, 30 includes a front latch 36 operatively coupled thereto. The front latches 36 selectively engage the respective forward strikers 18. Each of the rear legs 32, 34 includes a rear latch 38 operatively coupled thereto. The rear latches 38 selectively engage the respective rearward strikers 20. Each rear leg 32, 34 includes an opening 35 for receiving and retaining the rearward strikers 20 between the rear legs 32, 34 and the respective rear latches 38.

A release handle 40 is operatively connected to the rear latches 38 to release the rear latches 38 from a latched position, shown in FIGS. 1 through 4, to an unlatched position, shown in FIGS. 5 through 8. When the rear latches 38 are in the unlatched position, the seat assembly 10 pivots about the forward strikers 18 from a generally upright position, shown in FIG. 1, to a tumbled position, shown in FIG. 8.

Figure 3:
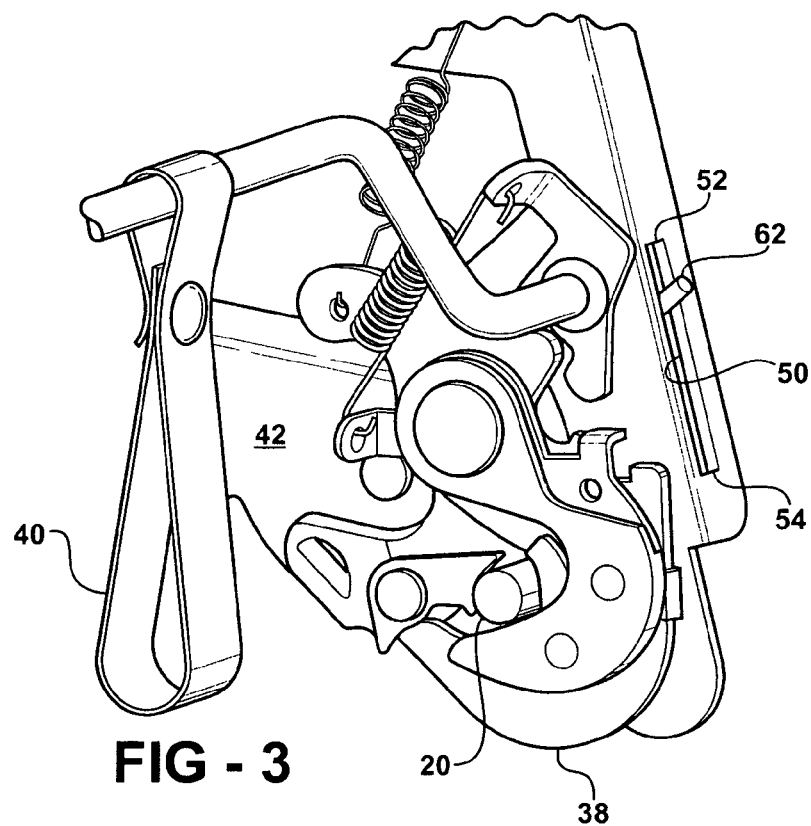
FIG. 3 is an enlarged inboard view of the rear latch in a latched position.
Figure 4:
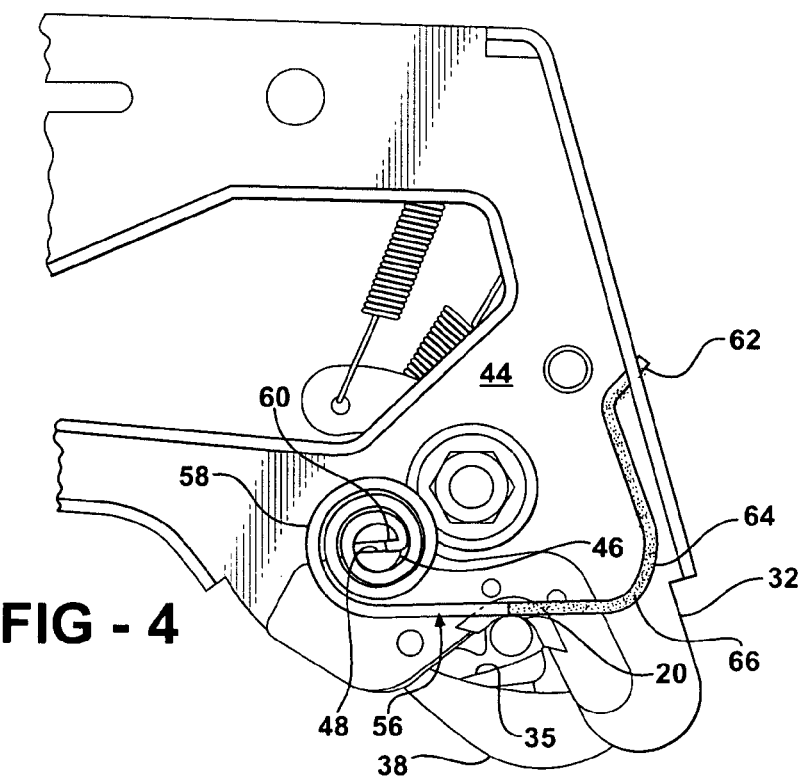
FIG. 4 is an enlarged outboard view of the rear latch in the latched position.
Figure 5:
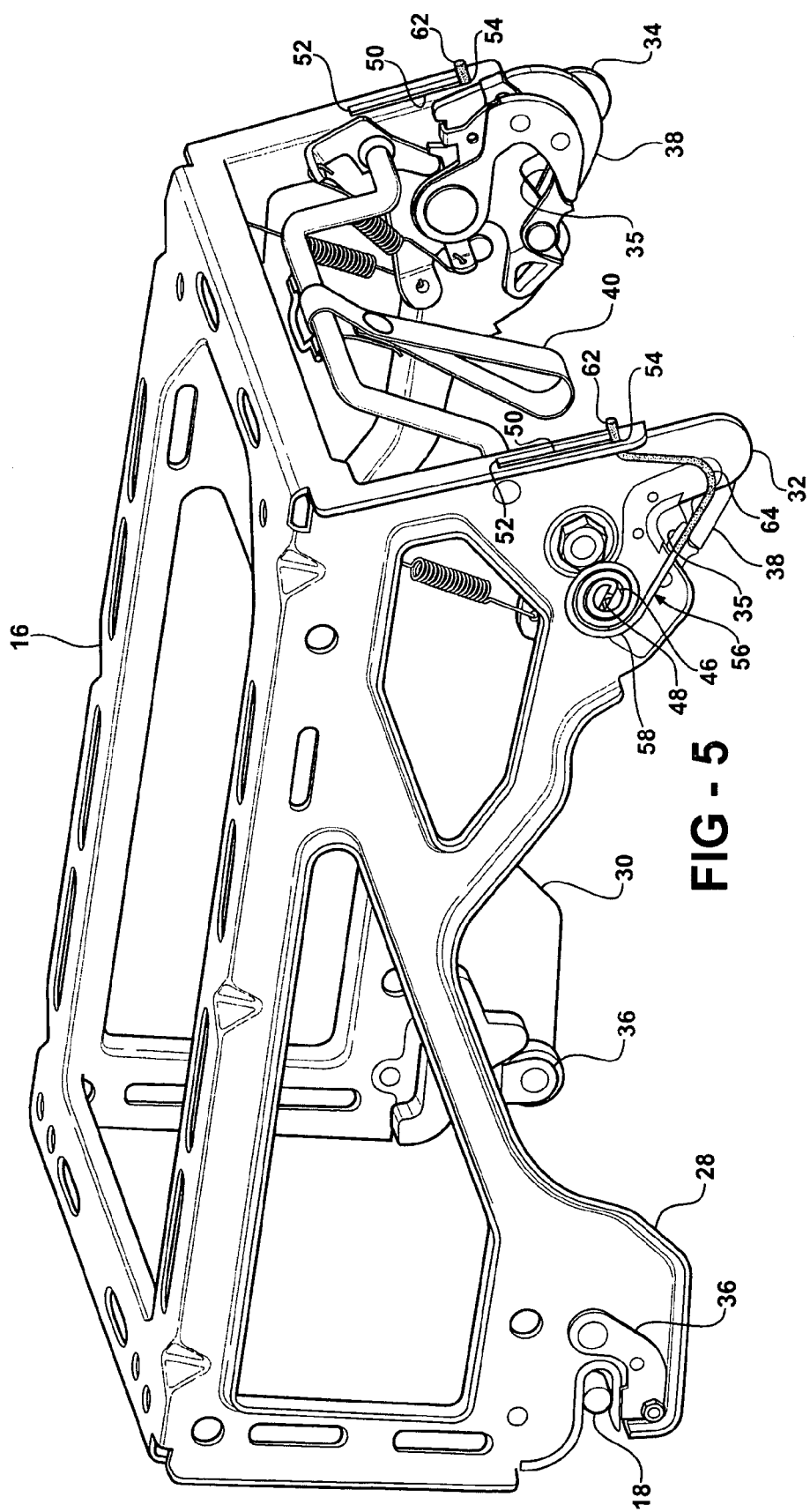
FIG. 5 is a perspective view of the seat riser including the rear latch in an unlatched position.
Figure 6:
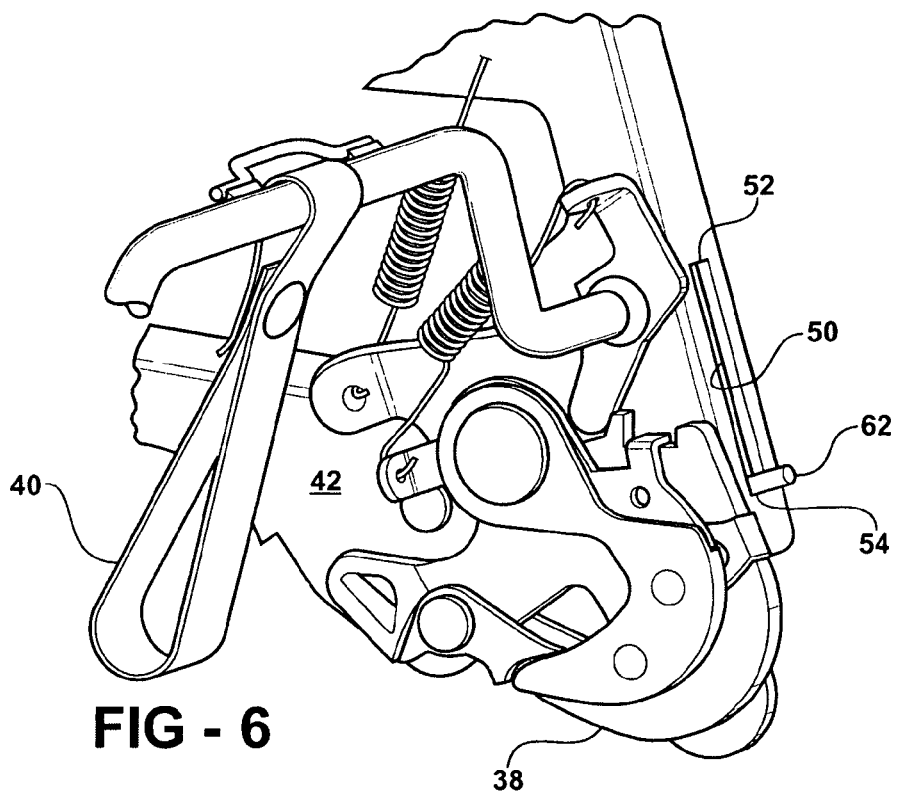
FIG. 6 is an enlarged inboard view of the rear latch in the unlatched position.
Figure 7:
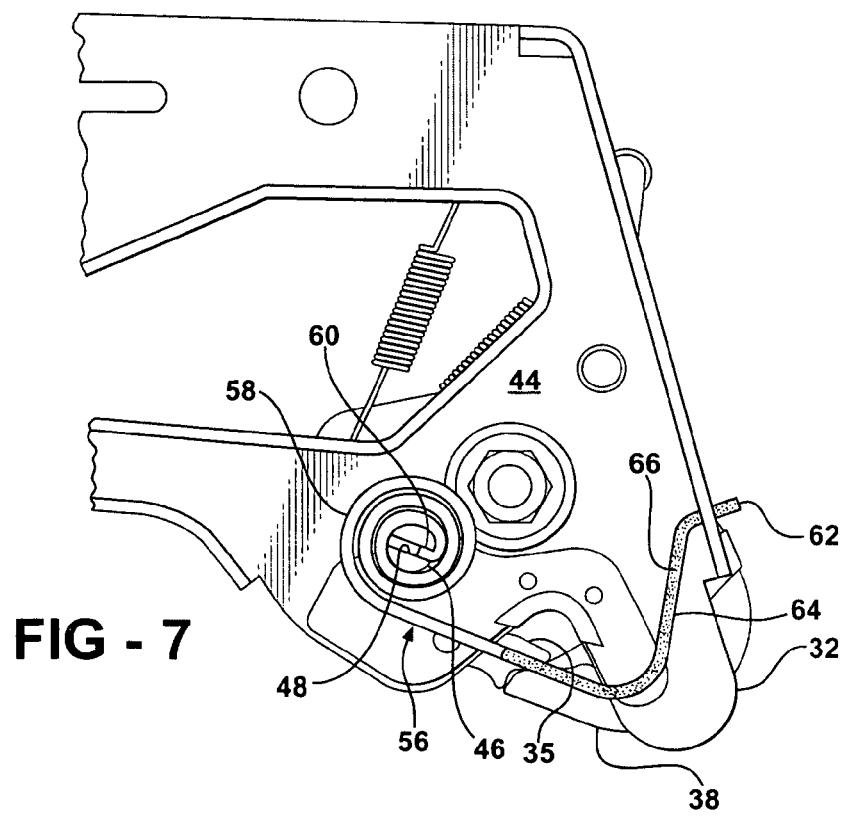
FIG. 7 is an enlarged outboard view of the rear latch in the unlatched position.
Figure 8:
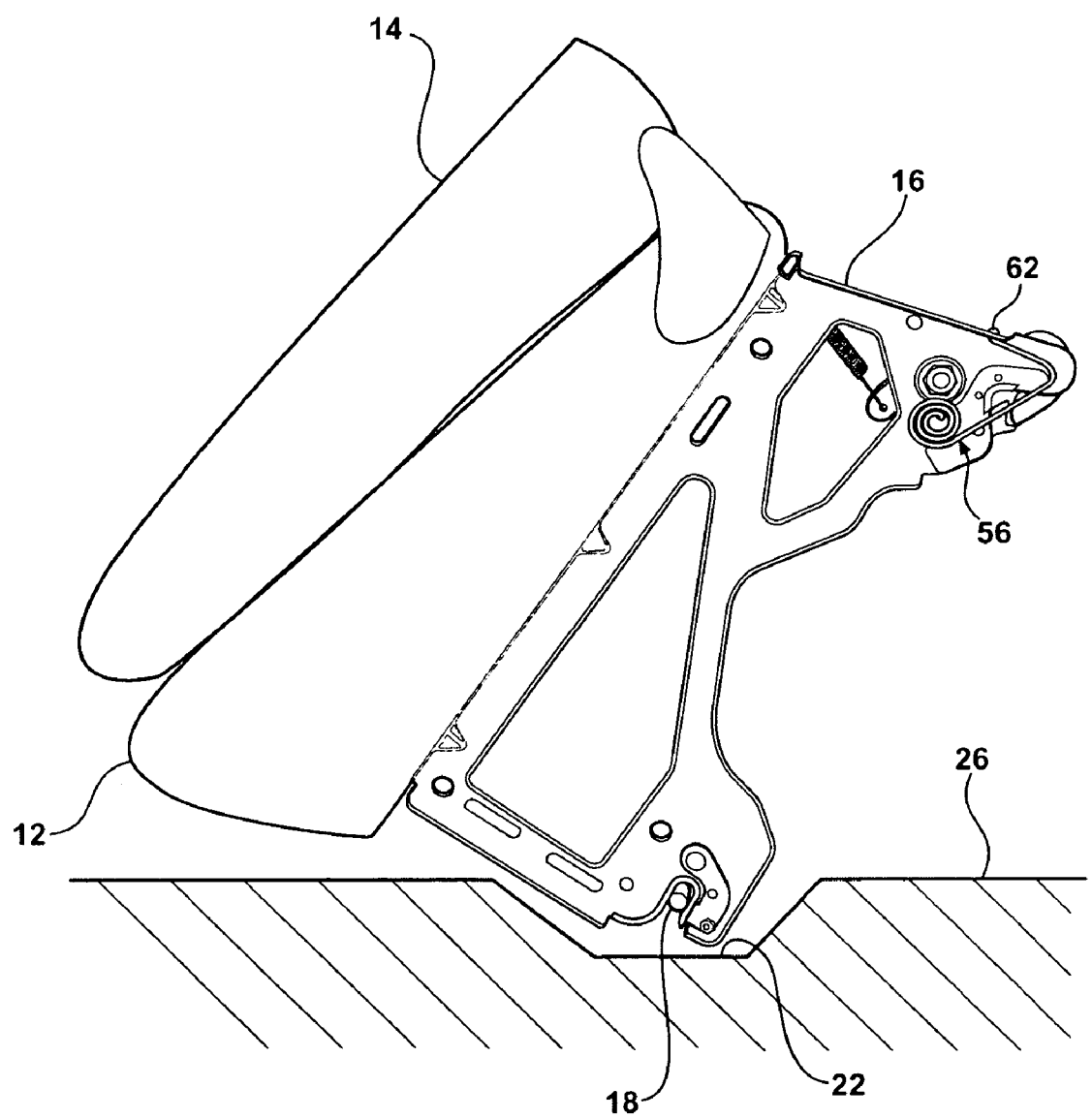
FIG. 8 is a side view of the seat assembly in a tumbled position.

Referring to FIGS. 3 and 4, each of the rear legs 32, 34 includes an inboard surface 42 and an opposing outboard surface 44. A support post 46 is fixedly secured along the outboard surface 44 of each rear leg 32, 34. Each support post 46 includes a radial slot 48.

Each of the rear legs 32, 34 also includes an elongated slot 50, shown in FIG. 3. In a preferred embodiment, the elongated slot 50 extends longitudinally between an upper end 52 and an opposing lower end 54.

Referring to FIG. 4, a spring assist member, generally indicated at 56, assists in pivoting the seat assembly 10 into the tumbled position. The spring assist member 56 includes a coiled spring 58 and a lever portion 64 extending between a first end 60 and an opposite second distal end 62. The coiled spring 58 wraps or coils around the support post 46. Moreover, the first end 60 is received within the radial slot 48 of the support post 46. In a preferred embodiment, the second distal end 62 is a free end received within the elongated slot 50, as shown in FIG. 3. More specifically, the free end 62 moves between the upper 52 and lower 54 ends of the elongated slot 50 as the rear latch 38 is latched and unlatched, respectively.

Referring again to FIG. 4, the lever portion 64 extends laterally along the outboard surface 44 of each rear leg 32, 34. The lever portion 64 also traverses the opening 35 to engage the rearward strikers 20. The free end 62 and the lever portion 64 are further biased towards the floor 26.

The lever portion 64 is coated with a plastic isolator material 66, which dampens vibration produced from rattling, squeaking, and buzzing that would otherwise be produced by the lever portion 64 abutting against the rearward striker 20. The free end 62 is also coated with the plastic isolator material 66 in order to eliminate noise that would otherwise by produced by the movement of the free end 62 within the elongated slot 50.

In operation, when the seat assembly 10 is in the upright position and the rear latches 38 are in the latched position, as shown in FIGS. 1 through 4, the rearward strikers 20 engage and press upwardly towards the lever portion 64 against the bias of the spring assist member 56. The bias of the spring assist member 56 maintains a downward force against the rearward strikers 20. When the rear latches 38 are latched, the free end 62 is located at the upper end 52 of the elongated slot 50 along one of the rear legs 32, 34.

To move the seat assembly 10 from the upright position to the tumbled position, the seat back 14 is first pivoted against the seat cushion 12. The release handle 40 is then pulled to move the rear latches 38 into the unlatched position. In the unlatched position, the rear latches 38 release the respective rearward strikers 20. The downward bias force of the spring assist member 56 initially pushes downwardly on the top of the rearward strikers 20, which then lifts the rear legs 32, 34 away from the floor 26 and initiates pivotal movement of the seat assembly 10 about the forward strikers 18 to the tumbled position. More specifically, with the first end 60 fixedly held into place by the support post 46, the lever portion 64 and the free end 62 spring downwardly against the rearward strikers 20 to assist in the lifting of the seat assembly 10. When the rear latches 38 are unlatched, the free end 62 is located at the lower end 54 of the elongated slot 50. The spring assist members 56 provide sufficient force to lift about 40 lbs. approximately 12 mm in the vertical direction. These parameters may, however, vary depending on the type of spring, coils, and biasing tension predetermined in the spring assist member 56.

When the seat assembly 10 is moved from the tumbled position back to the upright position, the spring assist members 56 initiate contact with the rearward strikers 20. The spring force of the spring assist member 56 is overcome by either the weight of the seat assembly 10 with gravity or the operator. Thus, the free end 62 moves towards the upper end 52 of the elongated slot 50, which allows each rear latch 38 to reengage the respective rearward strikers 20 for locking the seat assembly 10 in the upright position.

The invention has been described in an illustrative manner, and it is to be understood that the terminology, which has been used, is intended to be in the nature of words of description rather than of limitation.

Many modifications and variations of the invention are possible in light of the above teachings. It is, therefore, to be understood that within the scope of the appended claims, the invention may be practiced other than as specifically described.

What is claimed:

1. A seat assembly selectively engaging forward and rearward strikers along a floor of an automotive vehicle, said seat assembly comprising:
   a seat cushion;
   a seat back pivotally coupled to said seat cushion;
   a seat riser coupled to said seat cushion and including spaced apart rear legs, said seat riser including a rear latch operatively coupled to each of said rear legs for movement between a latched position engaged with the corresponding rearward strikers and an unlatched position disengaged from the corresponding rearward strikers; and
   a spring assist member including a lever portion extending between a first end fixedly secured to said rear leg and an opposite second distal end for engaging the rearward striker to assist in pivoting said seat assembly about the forward strikers as said rear latches release the rearward strikers in said unlatched position.

2. A seat assembly as set forth in claim 1 wherein said spring assist member includes a coiled spring mounted along said rear leg.

3. A seat assembly as set forth in claim 2 wherein said second distal end is a free end movable relative to said first end.

4. A seat assembly as set forth in claim 3 wherein said rear leg includes an elongated slot for receiving said movable free end of said lever portion therewithin.

5. A seat assembly as set forth in claim 4 wherein each of said rear legs includes an opening for receiving and retaining the rearward strikers between said rear legs and said rear latches and said lever portion traversing said opening for engaging the rearward striker.

6. A seat assembly as set forth in claim 5 including a support post fixedly secured to one of said rear legs for receiving said coiled spring therearound.

7. A seat assembly as set forth in claim 6 wherein said support post includes a radial slot for receiving said first end of said lever portion.

8. A seat assembly as set forth in claim 7 including a release handle operatively connected to each of said rear latches for actuating said rear latches from said latched position to said unlatched position thereby releasing the rearward strikers therefrom.

9. A seat assembly as set forth in claim 8 wherein said spring assist member is partially coated with a plastic isolator material for dampening vibration between said spring assist member and the rearward strikers.

10. A seat assembly as set forth in claim 9 wherein said seat riser includes a pair of front legs having front latches operatively coupled thereto for selectively engaging the forward strikers.

\* \* \* \* \*